UNITED STATES PATENT OFFICE.

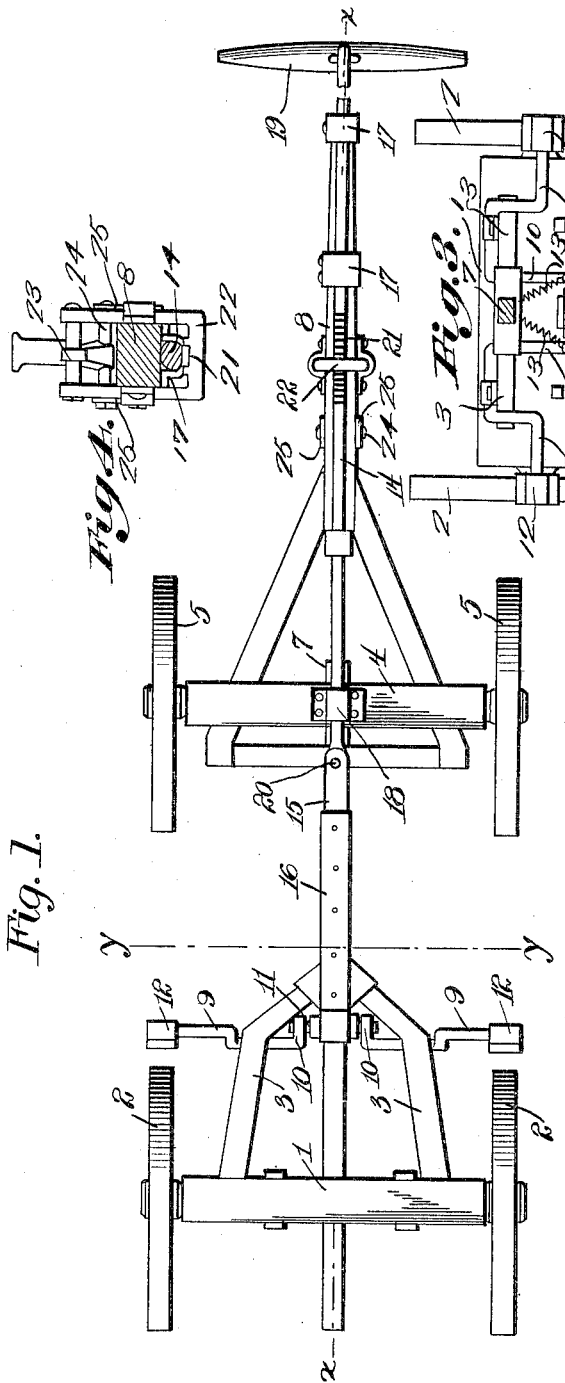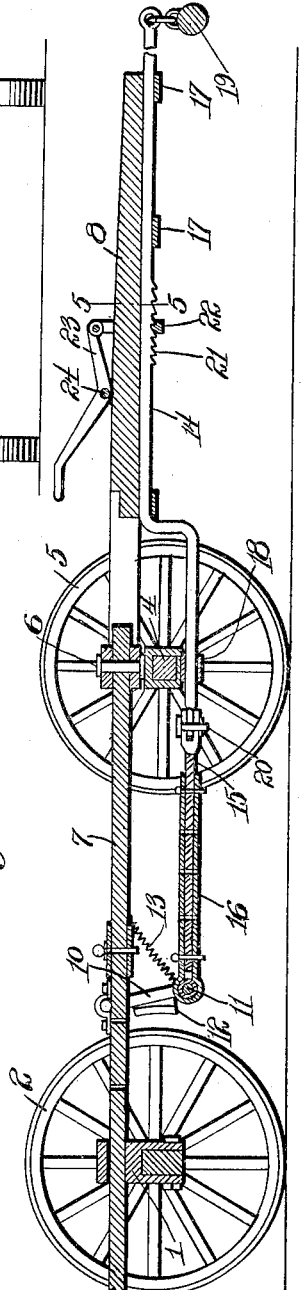

CHARLES C. COX, OF PULASKI, VIRGINIA.

AUTOMATIC VEHICLE-BRAKE.

1,082,410. Specification of Letters Patent. Patented Dec. 23, 1913.

Application filed November 20, 1912. Serial No. 732,555.

*To all whom it may concern:*

Be it known that I, CHARLES C. COX, a citizen of the United States, residing at Pulaski, in the county of Pulaski and State of Virginia, have invented new and useful Improvements in Automatic Vehicle-Brakes, of which the following is a specification.

The invention has relation to brakes designed most especially for wagons and automatic in operation to be set when descending grade, thereby preventing the vehicle from crowding or running down the team.

The invention provides a novel brake beam having crank portions to which the brake shoes and the force for setting the brakes are applied, said brake beam being mounted in a manner to turn to admit of the brakes being applied or released accordingly as the vehicle has a tendency to move forward and crowd the team or is drawn forward.

The invention further consists of the peculiar connections between the brake beam and neck yoke and the connections whereby the set of the brakes may be fixed by the driver.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a view of a vehicle running gear inverted, showing the same equipped with an automatic brake mechanism embodying the invention. Fig. 2 is a longitudinal section on the line *x—x* of Fig. 1, the running gear being in normal position. Fig. 3 is a transverse section on the line *y—y* of Fig. 1. Fig. 4 is a cross section on the line 5—5 of Fig. 2.

Corresponding and like parts are referred to in the following description, and indicated in all the views of the drawings, by the same reference characters.

The vehicle running gear illustrated is of the type generally employed for wagons, the same comprising a rear axle and bolster 1, rear wheels 2, rear hounds 3, front axle and bolster 4, front wheels 5, king bolt 6, a coupling pole or reach 7 and a pole or tongue 8 to which the team is hitched in the accustomed way. In the event of the running gear being of the type designed for hauling lumber, poles and beams the rear truck, including the part 1 and adjunctive elements, is adjustable, the pole or reach 7 sliding through the rear hounds 3 and part 1 and being secured thereto in the adjusted position in any well known way.

The brake mechanism includes a brake beam which is preferably of sectional formation and mounted upon the rear hounds 3 in a manner to turn freely. Each section of the brake beam has an outer crank portion 9 and an inner arm 10, the two arms 10 being connected by means of a pin or bolt 11 and forming therewith an intermediate crank portion with which the sectional operating rod is connected. Brake shoes 12 are fitted to the crank portions 9 in position to engage the rear wheels 2. A spring 13 connected with the intermediate crank of the brake beam serves to normally hold the brake shoes 12 away from the rear wheels 2. The parts are so arranged that a rearward pressure applied to the intermediate crank of the brake beam turns the latter to bring the brake shoes in engagement with the rear wheels. This occurs when the vehicle is descending grade or tends to crowd or run down the team.

The operating rod embodies a plurality of sections 14, 15 and 16 which are of such construction as to admit of the operating rod being lengthened or shortened to suit the distance between the front and rear trucks or axles of the running gear. The section 14 extends beneath the pole or tongue 8 and is held thereto by means of keepers 17. The rear portion of the section 14 is offset so as to extend beneath the front axle 4 to which it is held by means of a keeper 18 which like the keeper 17 constitutes a guide to direct the front portion of the operating rod in its movements. The neck yoke 19 is attached to the front end of the section 14, which extends beyond the pole or tongue 8. The intermediate section 15 is pivotally connected to the rear end of the section 14, as indicated at 20, this being essential to admit of the turning of the front axle or truck for steering. The rear section 16 consists of a bar or strap doubled upon itself and receiving the pin or crank portion 11 in the fold, the upper and lower portions of the section 16 embracing the section 15 and having a plurality of openings to register with openings formed in the section 15, whereby the parts 15 and 16 may be adjusted to accommodate the distance between the front and rear axles. The section 14 of the operating rod has ratchet teeth 21 on its under side which are adapted to be engaged by means of a shackle 22 having connection with a lever 23 which is fulcrumed upon the pole or tongue 8 in position to be readily engaged by the foot of the driver. The lever 23 is mounted upon a pin or bolt 24 supported by means of plates 25 bolted to opposite sides of the pole or tongue 8. When the upper end of the lever 23 is depressed the shackle 22 is elevated, thereby engaging one of the teeth 21 and limiting the rearward movement of the operating rod and the set or application of the brakes. When the lever 23 is moved to cause the shackle 22 to clear the toothed portion 21 of the operating rod the latter is free to move rearward when the vehicle is descending a grade, thereby resulting in the brakes being automatically applied to prevent the vehicle from running upon the team. When the draft is applied to move the vehicle forward the operating rod is moved forward, thereby releasing the brakes, but any tendency of the vehicle to move forward to run down the team causes the operating rod to move rearwardly and automatically set the brakes.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In an automatic brake for vehicles in combination with the rear wheels and pole, a brake beam provided with brake shoes arranged to engage the rear wheels, an operating rod extending beneath the pole and having connection at its rear end with the brake beam and provided in its length with teeth, a neck yoke connected with the front end of the operating rod, a lever mounted upon the pole and having one end within convenient reach of the driver, a shackle connected with the opposite end of the lever and embracing opposite sides of the pole and having a portion extending beneath the same to engage the toothed portion of the operating rod.

2. In an automatic brake for vehicles embodying rear wheels and a pole or tongue, a brake beam provided with brake shoes for engaging the rear wheels, a sectional operating rod arranged beneath the pole and having connection at its inner end with the brake beam and provided in its length with teeth, a neck yoke at the front end of the operating rod, a lever mounted upon the pole and having its rear end within convenient reach of the driver, a shackle connected with the front end of the lever and embracing opposite sides of the pole and having a portion extending beneath the pole to engage the teeth of the operating rod, and plates secured to the sides of the pole and engaging the side members of the shackle to hold the same in proper position.

In testimony whereof I affix my signature in presence of two witnesses.

CHARLES C. COX.

Witnesses:
 ALLEN T. ESKRIDGE, Jr.,
 N. I. VANCE.

---

Copies of this patent may be obtained for five cents each, by addressing the "Commissioner of Patents, Washington, D. C."